United States Patent [19]
Sommerer

[11] 3,938,405
[45] Feb. 17, 1976

[54] ACTUATING MECHANISM FOR BOWDEN CABLES OF A HAND BRAKE

[75] Inventor: Karl Sommerer, Stuttgart-Zuffenhausen, Germany

[73] Assignee: Dr. -Ing. H.c.F. Porsche Aktiengesellschaft, Firma, Germany

[22] Filed: May 17, 1974

[21] Appl. No.: 471,051

[30] Foreign Application Priority Data
May 17, 1973  Germany............................ 2324871

[52] U.S. Cl............................................ 74/501 R
[51] Int. Cl.[2]....................................... F16C 1/10
[58] Field of Search ...... 74/501 R, 501 P, 491, 469, 74/517, 502, 480 B; 188/2 D

[56] References Cited
UNITED STATES PATENTS 2,821,275  1/1958  Martin ........................ 74/483 PB X
3,605,932  9/1971  Wilfert et al. ................. 74/501 R X Primary Examiner—Samuel Scott
Assistant Examiner—Frank H. McKenzie, Jr.
Attorney, Agent, or Firm—Craig & Antonelli

[57] ABSTRACT

An actuating installation for the Bowden cables of a hand brake, in which a first Bowden cable that starts at the hand brake, has a fixed support as regards its casing at its end facing the hand brake and is movably supported with its casing end opposite the hand brake; a transmission device which is connected with the free end of the casing of the first Bowden cable by way of adjusting means, is secured at the core of a second Bowden cable; the adjusting means is thereby freely movably supported in such a manner that during a brake actuation the cores of the two Bowden cables are movable in directions toward one another.

12 Claims, 4 Drawing Figures

Fig 1

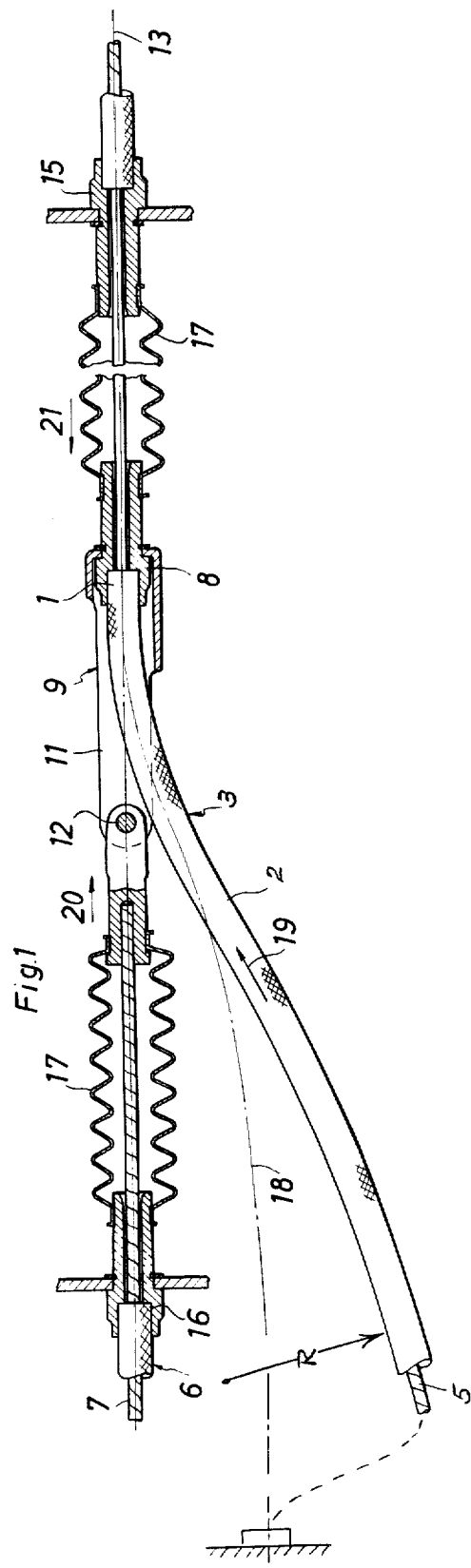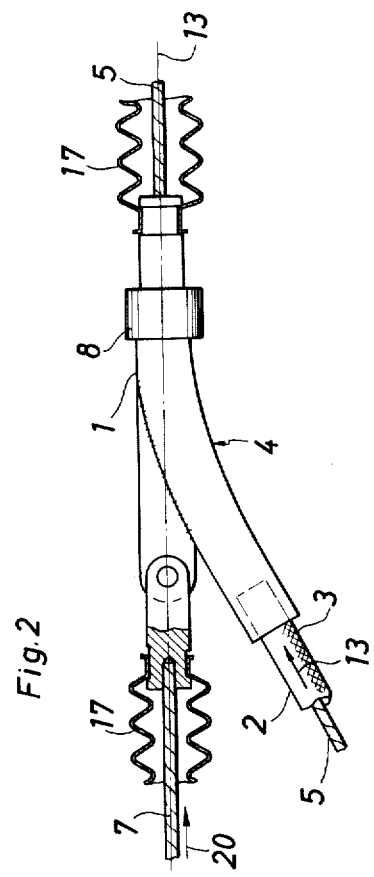

ACTUATING MECHANISM FOR BOWDEN CABLES OF A HAND BRAKE

The present invention relates to an actuating installation for the Bowden cables of a hand brake, whereby the Bowden cable starting from the hand brake has a fixed support as regards its casing with its end facing the hand brake and is movably supported with its casing end opposite the hand brake and is connected by means of a transmission device with a further Bowden cable.

In a known actuating installation for the Bowden cables of a hand brake, the freely movably supported casing end of the Bowden cable opposite the hand brake lever exerts a force on an angle lever, at which are provided Bowden cables leading to the brakes at the left and right wheel. The angle lever or bell crank having several points of bearing support is thereby disadvantageous.

In contradistinction thereto, it is the aim of the present invention to provide an actuating installation of the aforementioned type, in which a space-saving arrangement is possible in a simple manner while avoiding several bearing support points and in which deflection movements such as, for example, with an angle lever, are avoided.

The underlying problems are solved according to the present invention in that the transmission mechanism consists of an adjusting means connected with the free end of the casing of the first Bowden cable which is secured at the core of the further Bowden cable and the adjusting means includes a freely movable support in such a manner that with a brake actuation, the cores of the Bowden cables are movable against one another, i.e., toward each other in opposite directions with respect to one another.

According to a further feature of the present invention, provision is made that the free casing end of the Bowden cable carries a sleeve which is operatively connected with a yoke connected with the core of the further Bowden cable.

An advantageous further development of the actuating installation according to the present invention resides in that the yoke consists of a slotted head portion with lateral formed-on connecting bars, at which the core of the further Bowden cable is adapted to be secured by way of connecting means.

The known manner of operation of a Bowden cable for hand brakes is combined by the present invention in an advantageous manner with the special construction of the adjusting means of the present invention, whose construction assures the required even force transmission to both rear wheel brakes.

This is additionally assisted by the present invention in that the free end of the first Bowden cable and the cores guided at a predetermined spacing in locally fixed bearing bushes are arranged on a straight line and the Bowden cable includes for the purpose of support, a connecting pin provided on the straight line between the connecting bars of the yoke. It is achieved thereby according to the present invention in an advantageous manner that a support of the freely movable Bowden cable end becomes possible and a completely satisfactory functioning and operation is ensured while a buckling of the actuated Bowden cable is avoided.

These and other objects, features and advantages of the present invention will become more apparent from the following description when taken in connection with the accompanying drawing which shows, for purposes of illustration only, two embodiments in accordance with the present invention, and wherein:

FIG. 1 is an elevational view, partly in cross section, of a first embodiment of an actuating installation for a hand brake in accordance with the present invention;

FIG. 2 is a partial, elevational view, similar to FIG. 1 and partly in cross section, of a second embodiment of the transmission mechanism in the hand brake actuating installation according to the present invention;

Figure 3:
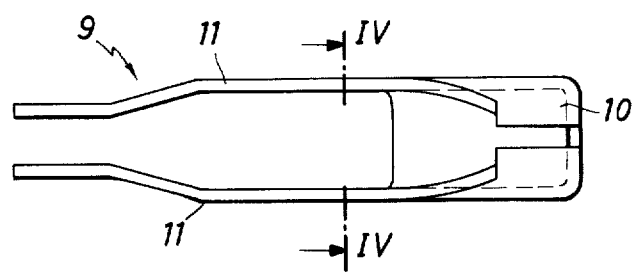
FIG. 3 is a plan view on a detail of the arrangement of FIG. 1 illustrating the yoke thereof.

Referring now to the drawing wherein like reference numerals are used throughout the various views to designate like parts, the Bowden cables for a hand brake include a first Bowden cable generally designated by reference numeral 3 and directly secured at the hand brake lever (not shown), which leads to the right rear wheel brake, as well as a further Bowden cable generally designated by reference numeral 6 which leads to the left rear wheel brake. The arrangement of the actuating installation according to the present invention is provided in an advantageous manner for outwardly disposed hand brake levers, in which it is difficult to keep the cable lengths equal. Outwardly disposed hand brake levers are arranged at the vehicle outer side laterally of the driver's seat.

The flexible casing 2 of the Bowden cable 3 starting from the hand brake is laid out in a wide movable arc (FIG. 1) and is securely supported at the hand brake lever (not shown). The casing end 1 opposite the hand brake lever, in contrast thereto, is movably supported. This movably supported casing end 1 of the first Bowden cable 3 is coupled with the second Bowden cable 6 leading to the left rear wheel brake by way of adjusting means 4 (FIG. 2) or 8, 9 (FIG. 1). For that purpose the casing end 1 is connected with the core 7 of the Bowden cable 6 by means of a connecting member 4 (FIG. 2).

The core 5 of the Bowden cable 3 and the core 7 of the Bowden cable 6 are each once again supported in fixed guide bushes 15 and 16, respectively, at a distance from the exit of the core out of the casing. A sealing sleeve 17 each is provided between the respective exit out of the corresponding casing and the guide bush 15 and 16. The bearing bushes 15 and 16 as well as the free casing end 1 of the Bowden cable 3 and the connecting pin 12 are disposed on a straight line 13 for the completely satisfactory functioning and operation of the hand brake.

Figure 4:
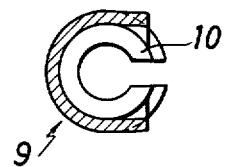
FIG. 4 is a cross-sectional view taken along line IV—IV of FIG. 3.

In a further embodiment according to the present invention, the casing end 1 carries a sleeve 8 which is operatively connected with a yoke 9 (FIGS. 1, 3 and 4) connected with the core 7 of the further Bowden cable 6. The adjusting means consisting of the sleeve 8 and of the yoke 9, owing to its two-partite construction, may be converted in a simple manner into an operationally ready unit without any welded, glued or similar connection. The yoke 9 includes a slotted head portion 10 and laterally formed-on connecting bars 11 (FIGS. 3 and 4). The core 7 of the further Bowden cable 6 is connected with the connecting bars 11 by way of the connecting means in the form of a pin 12.

During the actuation of the hand brake, the sheathing or casing 2 of the Bowden cable 3 moves into the position 18 indicated in dash and dot lines so that a pressure is exerted on the yoke 9 by way of the movable casing end 1 in the direction of arrow 19 (right rear wheel brake) or on the connecting member 4. Since the connecting member 4 is secured at the casing 2 and since the sleeve 8 is operatively connected with the yoke 9, from which the core 7 of the second Bowden cable 6 (left rear wheel brake) is again suspended, the core 7 of the Bowden cable 6 is able to move in the direction of arrow 20 opposite the movement (direction of arrow 21) of the core 5 of the first Bowden cable 3. The introduced brake force is uniformly distributed onto both brakes.

The yoke 9 as well as the bearing bushes 15 and 16 are preferably constructed slotted in order that a facilitated installation and exchange of the Bowden cables of the hand brake can be carried out.

In operation, the Bowden cable 3 of the hand brake is illustrated in its normal, released position in FIG. 1 in which it forms a wide arc (only schematically indicated) with radius R ending in the hand brake assembly. The core 5 is thereby secured at the hand brake lever (schematically indicated) while the associated casing 2 is fixedly supported at the hand brake. The casing end 1 supported in the adjusting means 9 which is disposed opposite the hand brake lever is supported in a sleeve 8. If the hand brake is now actuated, then the core 5 is pulled up and displaced out of the arcuate shape into a more or less rectilinear shape, i.e., the arc will be more or less eliminated. Since, however, the casing 2 is immovably or fixedly supported at the hand brake lever, the casing 2 is forced to move in the direction of arrow 19 in order to compensate for the change in length due to the disappearance of the arc, i.e., in order to compensate for the shortened length caused by the straightening of the core 5 and therewith of the casing 2. This straightening of the core 5 and therewith of the casing 2, i.e., the disappearance of the arc is schematically indicated in FIG. 1 and designated by reference numeral 18. Consequently, a pulling action of the core 7 of the Bowden cable 6 in the direction of arrow 20 will take place as the end 1 of the casing 2 secured in the sleeve 8 will seek to move in this same direction (arrow 20) to absorb the length of the Bowden cable which has been eliminated by the straightening thereof.

While I have shown and described only two embodiments in accordance with the present invention it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. An actuating installation for the Bowden cables of hand brakes which includes a first Bowden cable means starting from the hand brake, said first Bowden cable means having a fixed support as regards its casing with its end facing the hand brake and being movably supported with its casing end opposite the hand brake, and the first Bowden cable means being operatively connected with a second Bowden cable means by way of a transmission means, characterized in that the transmission means includes an adjusting means operatively connected with the free end of the casing of the first Bowden cable means, the adjusting means being secured at the core of the second Bowden cable means, and the adjusting means includes a support freely movable in such a manner that during a brake actuation the cores of the two Bowden cable means are movable in directions opposite one another.

2. An actuating installation according to claim 1, characterized in that the cores of the two Bowden cable means are movable toward one another during a brake actuation.

3. An actuating installation according to claim 2, characterized in that the free casing end of the first Bowden cable means carries a sleeve as adjusting means which is operatively connected with a yoke means operatively connected with the core of the second Bowden cable means.

4. An actuating mechanism according to claim 3, characterized in that the yoke means consists of a slotted head portion with lateral formed-on connecting bars, at which the core of the second Bowden cable means is adapted to be secured by way of connecting means.

5. An actuating mechanism according to claim 4, characterized in that the connecting means include a connecting pin.

6. An actuating mechanism according to claim 4, characterized in that the free end of the first Bowden cable means and the cores of the two Bowden cable means guided at a distance in fixed bearing bushes are arranged on a substantially straight line and the second Bowden cable means includes a connecting pin for its support between the connecting bars of the yoke, said connecting pin being also disposed on the straight line.

7. An actuating mechanism according to claim 2, characterized in that a connecting member is provided as adjusting means which consists of a rigid part in which the casing of the first Bowden cable means is fixedly supported and to which the core of the second Bowden cable means is adapted to be connected.

8. An actuating mechanism according to claim 7, characterized in that the connecting member is fixedly connected with a yoke means by way of a sleeve, said yoke means being operatively connected with the core of the second Bowden cable means.

9. An actuating mechanism according to claim 8, characterized in that the yoke means consists of a slotted head portion with lateral formed-on connecting bars, at which the core of the second Bowden cable means is adapted to be secured by way of connecting means.

10. An actuating mechanism according to claim 9, characterized in that the connecting means include a connecting pin.

11. An actuating mechanism according to claim 9, characterized in that the free end of the first Bowden cable means and the cores of the two Bowden cable means guided at a distance in fixed bearing bushes are arranged on a substantially straight line and the second Bowden cable means includes a connecting pin for its support between the connecting bars of the yoke, said connecting pin being also disposed on the straight line.

12. An actuating mechanism according to claim 1, characterized in that the free end of the first Bowden cable means and the cores of the two Bowden cable means guided at a distance in fixed bearing bushes are arranged on a substantially straight line.

* * * * *